United States Patent [19]

Miyatani et al.

[11] 4,124,464

[45] Nov. 7, 1978

[54] GROOVED N-TYPE TIO2 SEMICONDUCTOR ANODE FOR A WATER PHOTOLYSIS APPARATUS

[75] Inventors: Kazuo Miyatani, Tokyo; Isao Sato, Kodaira, both of Japan

[73] Assignee: RCA Corporation, New York, N.Y.

[21] Appl. No.: 843,700

[22] Filed: Oct. 19, 1977

[51] Int. Cl.$^2$ .......................... C25B 1/02; C25B 9/00; C25B 11/02

[52] U.S. Cl. .................................... 204/129; 204/242; 204/278; 204/290 F; 204/DIG. 3; 250/527; 429/111; 428/167; 428/168

[58] Field of Search .............. 204/128, 129, 242, 278, 204/290 R, 290 F, DIG. 3; 250/527; 429/111; 428/167, 168

[56] References Cited

U.S. PATENT DOCUMENTS

| | | | |
|---|---|---|---|
| 2,572,079 | 10/1951 | Von Hippel et al. | 136/89 |
| 2,870,344 | 1/1959 | Brattain et al. | 307/885 |
| 3,031,520 | 4/1962 | Clampitt et al. | 136/89 |
| 3,113,047 | 12/1963 | Lasser et al. | 136/6 |
| 3,114,658 | 12/1963 | Zaromb | 136/6 |
| 3,255,044 | 6/1966 | Powers et al. | 136/86 |
| 3,271,198 | 9/1966 | Winogradoff et al. | 136/89 |
| 3,628,017 | 12/1971 | Lerner | 250/83 |
| 3,925,212 | 12/1975 | Tchernev | 250/527 |
| 4,011,149 | 3/1977 | Nozik | 204/129 |
| 4,029,566 | 6/1977 | Brandmair et al. | 204/290 F |
| 4,042,758 | 8/1977 | Weinstein et al. | 429/111 |
| 4,061,555 | 12/1977 | Miyatani et al. | 204/242 |

OTHER PUBLICATIONS

A. J. Nozik, "Electrode Materials for Photoelectrochemical Devices", *J. Crystal Growth*, vol. 39, pp. 200-219 (1977).

J. F. Houlihan et al., "Improved Solar Energy Conversion Efficiencies for the Photocatalytic Production of Hydrogen Via TiO2 Semiconductor Electrodes", *Mat. Res. Bull.*, vol. 11, pp. 1191-1198 (1976).

D. J. Jefferies, "High-Field Ohmic Contacts To Semiconducting SrTiO3 Single Crystals", *J. Appl. Phys.*, vol. 47, pp. 778-779 (1976).

T. Ohnishi et al., "The Quantum Yield of Photolysis of Water on TiO2 Electrodes", *Ber. Bunsen Gesell.* vol. 79, pp. 523-525 (1975).

A. Fujishima et al., "Hydrogen Production under Sunlight with an Electrochemical Photocell", *J. Electrochem. Soc.*, vol. 122, pp. 1487-1489 (1975).

K. L. Hardee et al., "Semiconductor Electrodes—Part I", *J. Electrochem. Soc.*, vol. 122, pp. 739-742 (1975).

F. Mollers et al., "On The Origin of the Photocatalytic Deposition of Noble Metals on TiO2, " *J. Electrochem. Soc.*, vol. 121, pp. 1160-1167 (1974).

D. Laser et al., "Semiconductor Electrodes—Part VI", *J. Electrochem. Soc.*, vol. 123, pp. 1027-1030 (1976).

A. Fujishima et al., "Electrochemical Photolysis of Water at a Semiconductor Electrode", *Nature*, vol. 238, pp. 37-38 (1972).

S. N. Paleocrassas, "Photocatalytic Hydrogen Production: A Solar Energy Conversion Alternative?" *Solar Energy*, vol. 16, pp. 45-51 (1974).

*Primary Examiner*—John H. Mack
*Assistant Examiner*—Aaron Weisstuch
*Attorney, Agent, or Firm*—H. Christoffersen; B. E. Morris; A. Stephen Zavell

[57] ABSTRACT

An n-type TiO2 semiconductor anode for a water photolysis cell having one or more grooves exhibits increased oxygen evolution and greater photocurrent with minimal photon reflection losses.

17 Claims, 4 Drawing Figures

GROOVED N-TYPE TIO₂ SEMICONDUCTOR ANODE FOR A WATER PHOTOLYSIS APPARATUS

The present invention relates to an anode which is useful in a water photolysis apparatus and, more specifically, to an anode which improves the efficiency of the water photolysis apparatus.

BACKGROUND OF THE INVENTION

With the recent realization that petroleum supplies are not inexhaustable and that increasing use of fossil fuel supplies, such as coal, will cause undesirably high pollution levels, man has been searching for alternative forms of energy and clean fuels. Hydrogengas is one solution to these problems. The only biproduct of the burning of hydrogen gas with oxygen is water vapor. Therefore, man has been experimenting with ways to produce the vast quantities of hydrogen and oxygen necessary to supply fuel and energy to industry.

Water photolysis is the light catalyzed decomposition of water into hydrogen and oxygen gases. The net photochemical reaction for the decomposition of water can be illustrated by the following reaction:

$$H_2O(l) + \text{light} \rightarrow \tfrac{1}{2} O_2 \uparrow + H_2 \uparrow \qquad (1)$$

The hydrogen generated by the above reaction can be burned as fuel or sold for use in numerous chemical applications. The generated oxygen can be used to support combustion or collected and also sold for use in numerous private and industrial applications.

The evolution of hydrogen and oxygen from a water photolysis apparatus is known in the art. A typical prior art water photolysis apparatus may include a titanium dioxide (TiO₂) anode and a platinum cathode immersed in an electrolyte solution. Other prior art water photolysis apparatus are described in U.S. Pat. Nos. 3,925,212 and 2,011,149 issued to Tchernev and Nozik respectively. More specifically, the Tchernev and Nozik references utilize semiconductors for the anode and cathode of a water photolysis apparatus.

The absorption of solar radiation by an n-type semiconductor anode excites the anode material, creating electron-hole pairs according to the following equation:

$$\text{semiconductor anode} + \text{solar radiation} \rightarrow e^- + p^+ \qquad (2)$$

Holes (p⁺) are the unoccupied energy levels of the semiconductor anode material when excited by solar radiation. The electrons and holes cause electrochemical reaction to occur at the semiconductor/electrolyte solution and cathode/electrolyte solution interfaces according to Schottky barrier theory. More specifically, the generated holes are attracted to the Schottky barrier at the semiconductor anode/solution interface, resulting in the combination of the positively charged holes and hydroxyl anions (OH⁻) in solution to form oxygen and water. This reaction is illustrated by the following equation:

$$4OH^- + 4p^+ \rightarrow O_2 \uparrow + 2H_2O \qquad (3)$$

wherein $p^+$ is a hole.

The electrons generated from the absorption of solar radiation by the n-type semiconductor anode (see equation 2) flow to the cathode through a suitable connection, e.g., a wire. The electrons, flowing to the cathode, are then attracted to the solution and leave the cathode at the cathode/solution interface and react with water to form hydrogen gas and hydroxyl ions as evidenced by the following equation:

$$2H_2O + 2e^- \rightarrow H_2 \uparrow + 2OH^- \qquad (4)$$

wherein $e^-$ is an electron. Thus, hydrogen forming at the cathode and oxygen forming at the semiconductor anode are the products of the electrochemical reactions taking place at the anode/solution interface and the cathode/solution interface respectively.

If a material is selected for the cathode with a high overvoltage for hydrogen, then a biasing voltage, sufficient to overcome the overvoltage, will have to be applied to the water photolysis apparatus at the cathode to drive the hydrogen gas-generating reaction. Overvoltage is defined as the excess voltage above the normal reversible electrode potential of a metal electrode required to decompose a solution or cause a decomposition on the electrode. Ideally, cathode materials with a 0.00 volt hydrogen overvoltage would maximize the generation of hydrogen gas or a given amount of solar radiation impinging upon an n-type semiconductor anode.

The use of TiO₂ as a semiconductor anode in a water photolysis apparatus has been shown in the prior art. See, T. Ohnishi et al., Berichte Bunsen-Gesellschaft BD. 79, Nr. 6, pp. 523–525 (1975); Fujishima and Honda, Nature, Vol. 238, pp. 37–38, July 9, 1972; Laser et al., J. Electrochem. Soc. Vol. 123, No. 7, pp. 1027–1030 (1976); Mollers et al., J. Electrochem. Soc., Vol. 121, No. 9, pp. 1160–1167 (1974); Hardee et al., J. Electrochem. Soc., Vol. 122, No. 6, pp. 739–742 (1975); Fujishima et al., J. Electrochem. Soc., Vol. 122, No. 11, pp. 1487–1489 (1975); S. N. Paleocrassas, Solar Energy, Vol. 16, pp. 45–51 (1974); and Houlihan et al., Mat. Res. Bull., Vol. 11, pp. 1191–1198, (1976). None of these articles disclose any effect of the anode surface of an n-type TiO₂ semiconductor on O₂ yield for absorbed photons, quantum efficiency of the cell for absorbed photons, and surface reflection loss. In addition, these references are silent on how to optimize the current available at the cathode through the use of a titanium diffusion junction ohmic contact.

Hardee et al. indicate that prior uses of TiO₂ anodes taught the preparation of a uniform, shiny, blue-gray TiO₂ coating on a Ti substrate by chemical vapor deposition (CVD). U.S. Pat. No. 3,271,198, to Winogradoff et al. teaches etching a single crystalline surface to produce a smooth surface to reduce surface recombination losses caused by surface roughness, irregularities and impurities. Ohnishi et al. disclose the use of single crystals of TiO₂ in the form of wafers, 10·10·1 mm, with optically flat (001) surfaces, i.e., smooth with respect to the incident light.

Initially, mirror finished TiO₂ semiconductor anodes, as outlined in numerous articles, were utilized to generate oxygen. However, measurements of oxygen gas evolution and photocurrent indicated that the smooth finished n-type semiconductor TiO₂ anodes did not provide sufficient combination centers for the holes generated by solar radiation to combine with hydroxyl ions (OH⁻) and generate O₂. Abrasively roughened surfaces provided an overabundance of recombination centers with the resultant further lowering of the O₂ evolution and much lower photo-current than the theoretically calculated quantum yield of current. The lower the photocurrent is from the theoretically calculated quantum yield, the lower also will be the yield of hydrogen gas from the cathode.

With respect to lower photocurrent, indium ohmic contacts, known in the art, provide only about 66% of the reaction current of titanium diffusion junction ohmic contacts formed by electron beam evaporation of titanium on the n-type $TiO_2$ semiconductor anode.

Our earlier filed application Ser. No. 760,551, filed Jan. 19, 1977 now U.S. Pat. No. 4,061,555, incorporated herein by reference, teaches an improved nickel-nickel monoxide cathode wherein the cathode is grooved to expose the nickel substrate below the nickel monoxide insulating layer and provide high density catalytically active centers for hydrogen evolution. The grooves in the cathode were made to restrict the current flow to the groove regions and thus to increase the circuit impedance in the grooved region to a value about that of the depletion layer at the n-type semiconductor anode, thereby allowing the water photolysis reaction to proceed with little or no applied biased voltage.

SUMMARY OF THE INVENTION

An improved n-type $TiO_2$ semiconductor anode having one or more grooves cut into one side of the surface of a mirror finished n-type $TiO_2$ semiconductor. The semiconductor anode invented permits the miminizing of surface reflection losses, the maximizing of $O_2$ gas evolution from the semiconductor anode surfce and the achieving of the theoretically calculated quantum yield of photocurrent from the non-reflected absorbed solar radiation to maximize the hydrogen gas evolution at the cathode of the water photolysis apparatus.

DETAILED DESCRIPTION OF THE INVENTION

Figure 1:
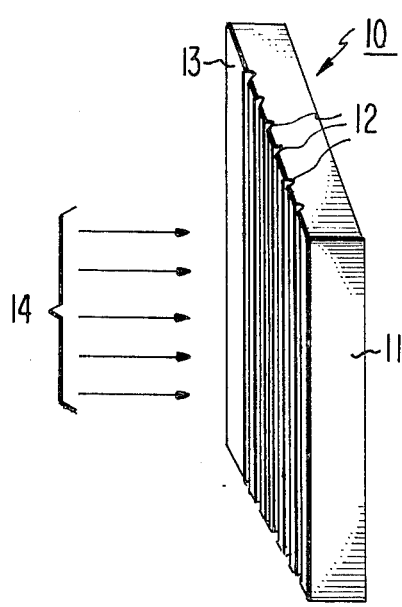
FIG. 1 is a perspective view of the n-type semiconductor anode of the present invention.

Referring to FIG. 1, the semiconductor anode of the present invention, which is capable of being utilized in a water photolysis apparatus, is designated as 10. The operation of the anode 10 in a water photolysis cell will be subsequently discussed. The anode 10 has a body 11 of n-type $TiO_2$ and one or more grooves 12, which may be substantially parallel to each other, inscribed in a first surface 13. The grooves 12 are formed by mechanical scribing, for example, with a tungsten carbide edge, or by conventional photolithographic and etching techniques. The grooves account for a very small portion of the total anode surface. The groove spacing is determined by the diffusion length of the hole-hydroxyl ion pairs formed on the anode surface. Diffusion length is defined as the distance an ion or a hole can migrate before recombination.

In a 1 cm wide electrode, for example, a single groove collects almost all the holes generated by solar radiation 14 striking the anode 10. In larger electrodes, the grooves spacing may be about 0.5 cm to about 1.5 cm apart and preferably about 1.0 cm apart. The width and depth can vary from about 0.02 mm to about 0.08 mm with a groove depth between about 0.3 mm and about 0.5 mm having no apparent change on the operation of the electrode. Preferably, the grooved depth and width are about 0.05 mm.

Figure 2:
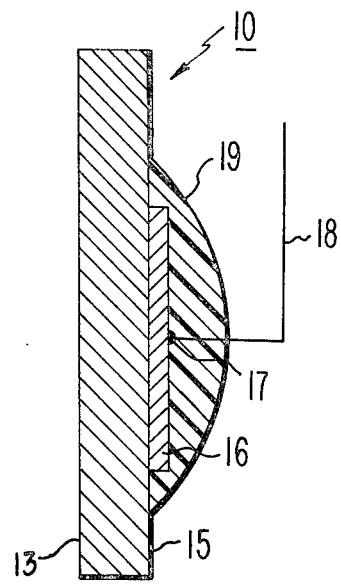
FIG. 2 is a cross-sectional view of the n-type semiconductor anode of the present invention having a titanium diffusion junction.

FIG. 2 depicts an anode 10 having an ohmic contact, for example, a titanium diffusion junction, on the anode surface 15 opposite the first surface 13 containing grooves 12. A metal layer 16 such as titanium, is contacted to surface 15 for the purpose of making an ohmic contact. The titanium may be contacted by implantation, i.e., evaporation by electron beam in a vacuum. Thereafter, a wire 18 is attached to metal layer 16 with solder 17 or by other means to provide a suitable electric contact. The metal layer 16 containing wire 18 contacted thereto at 17 is encapsulated with a resin 19, such as an epoxy resin, which insulates said metal layer during subsequent immersion in the water photolysis electrolyte.

Figure 3:
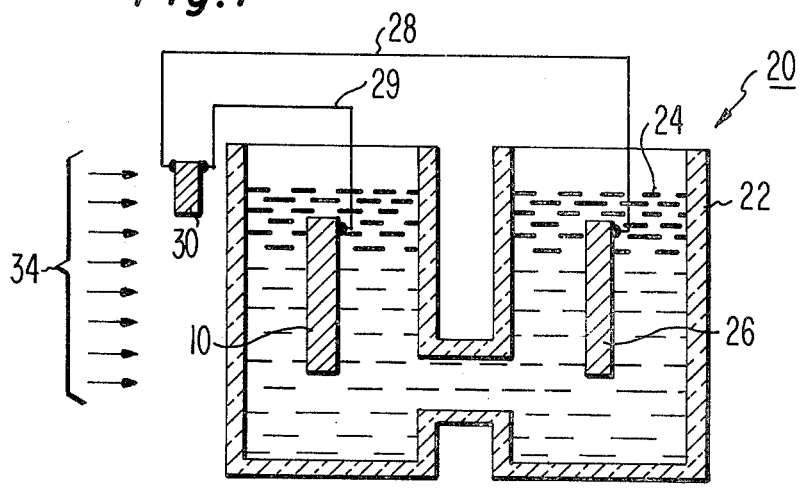
FIG. 3 is a cross-sectional view of a water photolysis apparatus with a biasing means incorporating the n-type semiconductor anode depicted in FIGS. 1 and 2.

FIG. 3 depicts a water photolysis apparatus containing a biasing means wherein said biasing means is a solar cell 30. The anode 10 of the present invention is utilized in a water photolysis apparatus designated as 20. The water photolysis apparatus 20 includes a housing 22 which contains therein an aqueous basic electrolyte solution, i.e., water and a basic electrolyte. It is assumed for the purpose of describing the present invention that the basic electrolyte dissolved in the water is sodium hydroxide (NaOH) at a concentration in a range of about 0.1 to about 5.0 normal. Other electrolytes can be employed such as potassium hydroxide as well as salts of weak acids such as calcium carbonate ($CaCO_3$). Persons skilled in the art will know that the pH of the electrolyte can be varied to optimize photocurrent and $O_2$ evolution for a particular water photolysis apparatus.

Contained in housing 22 and in contact with the solution 24 is a cathode 26. The cathode 26 may be constructed of platinum, Ni/NiO as taught in our application Ser. No. 760,551 now U.S. Pat. No. 4,061,555, or other suitable materials. The cathode 26 and the anode 10 are spaced from one another in housing 22.

A first wire 28 is in electrical contact with the cathode 26 and a second wire 29 is in electrical contact with anode 10. Both first and second wires 28 and 29 are in electrical contact with electrical biasing means 30, which is thus in series with cathode 26 and anode 10. For the purpose of describing the water photolysis apparatus 20, the electrical biasing means 30 is a solar cell.

The solar cell 30 is a conventional solar cell, typically of silicon, which converts solar radiation into electric potential and current. The electric potential and current are also known in the art as photovoltage and photocurrent when their source is derived from a solar cell. Solar radiation 34, FIG. 3, striking anode 10, creates electron-hole pairs which cause an electrochemical reaction to occur at the anode 10/solution 24 interface, resulting in the transfer of charges across the interface. More specifically, the generated holes are attracted to the Schottky barrier at the anode 10/solution 24 interface, resulting in holes going into the solution 24. These holes react with hydroxyl ions in solution, forming oxygen and water in accordance with equation (3).

The generated electrons from the anode 10 flow to the cathode 26 through the first and second wires 28 and 29, acquiring an increase in voltage potential as the current passes through solar cell 30. The electrons, which have travelled to the cathode 26, are then drawn into solution 24 and leave the cathode 26 at the cathode 26/solution 24 interface and react with the water, forming hydrogen and hydroxyl ions as previously illustrated by equation (4).

Thus, hydrogen formed at cathode 26 and oxygen formed at the anode 10 are the products of the electrochemical reaction which take place at the anode 10/solution 24 interface and the cathode 26/solution 24 interface. From the description of the operation of apparatus 20, it is evident that a current flowing through anode 10, cathode 26 and solution 24 is initiated by solar radiation 34 impinging on anode 10. The current through the anode 10, cathode 26 and the first and second wires 28 and 29 is the result of electron flow, while the current is carried through solution 24 back to anode 10 by ion flow.

The biasing means 30, herein a solar cell, serves the purpose of raising the cathode 26 voltage potential and also lowering the Fermi level of anode 10. Specifically, the solar cell 30 raises the potential of the cathode 26 to an operating voltage of about 0.5 to about 1.0 volt, which is about 0.15 to about 0.3 volt about the potential of cathode 26 if the cathode was unbiased. This increase in cathode 26 potential is hereafter referred to as overvoltage. The overvoltage applied to cathode 26 is sufficient to raise the potential of cathode 26 to a level sufficient to cause the evolution of hydrogen gas.

Figure 4:
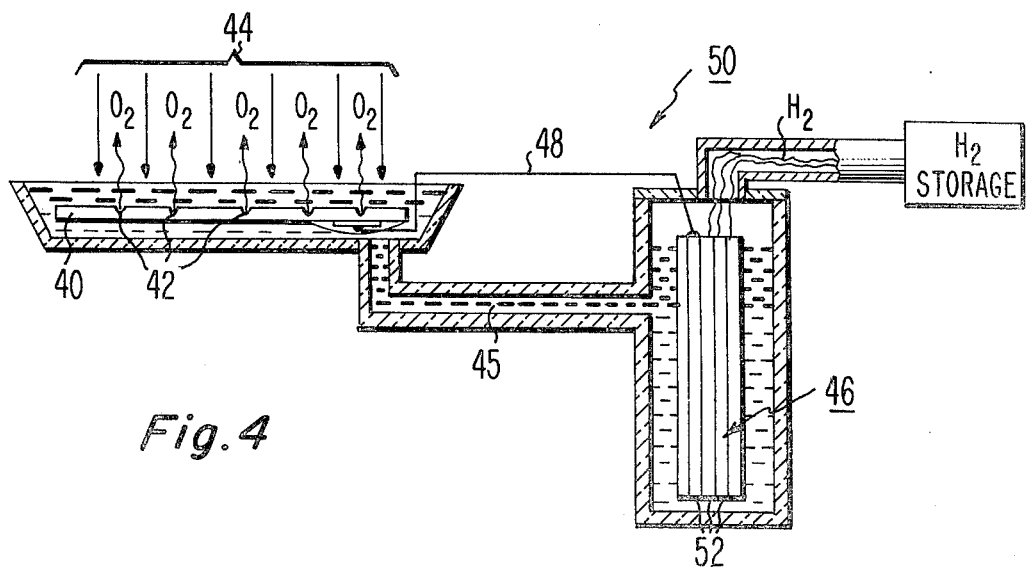
FIG. 4 is a cross-sectional view of a water photolysis apparatus incorporating the n-type semiconductor anode depicted in FIGS. 1 and 2.

FIG. 4 depicts a water photolysis apparatus 50 wherein a cathode 36 of sufficiently low hydrogen over-potential was selected to permit water photolysis apparatus operation without an electrical biasing means. Solar radiation 44 strikes anode 40 with grooves 42. The solar radiation 44 causes an electrochemical reaction between the n-type $TiO_2$ semiconductor anode 40 and the electrolyte 45 which is similar to that described above wherein the holes combined with the hydroxyl ions, forming oxygen and water. Anode 40 is in electrical contact with cathode 46 by wire 48 and through the electrolyte 45. The ionic current flows from cathode 46 to anode 40 through electrolyte 45 while the election current flows from anode 40 to cathode 46 through wire 48. The cathode 46 may be of any suitable material and preferably of a material which has a sufficiently low hydrogen overvoltage to permit the water photolysis apparatus to operate without an electrical biasing means. Furthermore, the cathode 46 may optionally contain grooves 52 as explained in our earlier application, Ser. No. 760,551 now U.S. Pat. No. 4,061,555.

The use of a grooved n-type $TiO_2$ semiconductor anode is not limited to either of the water photolysis apparatus as herein disclosed. The grooved semiconductor anode can be used in water photolysis apparatus as disclosed in U.S. Pat. Nos. 3,925,212 and 4,011,149 to Tchernev and Nozik respectively, or in other water photolysis apparatus known in the art.

The grooves in the n-type $TiO_2$ semiconductor anode act as active centers for oxygen evolution while mimimizing the effect of recombination, which results in poor photocurrent response and hence a lower hydrogen evolution. In addition, the grooves miminize the surface reflective losses of the semiconductor anode.

The invention will be further illustrated by the following examples, but it is to be understood that the invention is not meant to be limited to the details disclosed therein.

EXAMPLE 1

PART A

Semiconductor anodes of n-type $TiO_2$ were fabricated in thin plate form from rutile $TiO_2$. Thin plates of rutile $TiO_2$ were reduced in a vacuum at about $10^{-2}$ to about $10^{-5}$ torr by heating at about 900° to about 1300° C. for from about 8 to about 70 hours to prepare the n-type $TiO_2$. The optimized chemical composition of the n-type $TiO_2$ is about $TiO_{1.986}$. The n-type $TiO_2$ semiconductor anode prepared according to this procedure had a mirror-like finish, i.e. a smooth and shiny surface. Thereafter, a tungsten carbide cutting edge was used to mechanically fabricate thin grooves with a width and depth of about 0.05 mm along the surface of the semiconductor anode at about 1.00 cm intervals.

A titanium diffusion junction was fabricated on the surface of the n-type $TiO_2$ anode opposite to the grooved side which is to be subjected to irradiation by solar radiation. The diffusion junction was made by electron beam evaporation of a layer of titanium and sufficient amount of chromium to prevent the oxidation of the titanium to $TiO_2$ in a vacuum at about $10^{-6}$ to about $10^{-7}$ torr, while keeping the semiconductor anode plates at a temperature of about 500° C. The resultant n-type $TiO_2$ semiconductor anodes were maintained at a temperature of about 500° C. to about 600° C. for about 0.5 to about 2 hours to promote diffusion of the evaporated titanium into the n-type $TiO_2$ semiconductor anode plate. Thereafter, an electrical contact lead was soldered on the junction. The soldered lead and titanium diffusion junction was coated with a suitable insulating epoxy resin to protect the diffusion junction during its subsequent immersion in the electrolyte.

Part B

Comparative Testing

Semiconductor anodes prepared according to Part A were tested in a water photolysis apparatus similar to FIG. 3. The anode was positioned in the apparatus so that the grooves were in a vertical orientation. The water photolysis apparatus was exposed to solar radiation and the photocurrent of the cell was measured and found to be proportional to the light intensity. Oxygen gas evolved at the n-type $TiO_2$ semiconductor anode and hydrogen gas evolved at the Ni/NiO electrode prepared in accordance with our copending application Ser. No. 760,551 now U.S. Pat. No. 4,061,555.

In addition to the testing of the grooved surface prepared in accordance with Part A, various surfaces of n-type $TiO_2$ semiconductor anodes, e.g., mirror surface, number 600 number 4000 abrasively roughened surfaces, were prepared according to Part A to test for an minimize surface reflection loss, surface recombination, and oxygen gas evolution. Table 1 below gives a comparison of the data. In the Table, $N(O_2)$ is the quantum yield of oxygen for absorbed photons. The quantum efficiency $N_Q$ of the cell is measured in photocurrent for absorbed photons. The reflection loss of the cell is indicated as R(%). The non-reflected photons are converted into photocurrent at the quantum efficiency of $N_Q$. Quantum efficiency or quantum yield is defined as theoretically calculated maximum yield or efficiency for the given measurement, i.e., a quantum yield or a quantum efficiency of 1 is the maximum that can be obtained for a given measurement.

TABLE 1

| SURFACE | $N(O_2)$ | $N_Q$ | R % |
|---------|----------|-------|-----|
| Groove  | 0.9 ± 0.1 | 1.0 | 30 |
| Mirror  | <<1 | 1.0 | 30 |
| #600    | 0.6 – 1.0 | 0.6 – 1.0 | 50 |
| #4000   | about 0 | <<1 | 50 |

In the mirror surface semiconductor anode, the theoretically calculated quantum yield of photocurrent is generated but the conversion into oxygen gas is poor. This suggests the importance of active centers to convert the current flow into oxygen gas. Grooving the surface provides similar current and similar reflection losses to the mirror surface while creating active centers for holes to combine with hydroxyl ions and evolve oxygen gas at the theoretically calculated quantum yield.

The #4000 roughened surface covered with fine scratches has increased surface reflection losses, probably due to light scattering, with much lower photocurrent and oxygen evolution. The poor photoresponse suggests that the effect of the recombination centers created by the many fine scratches overcomes the effect of the active centers and this results in poor photocurrent and very little $O_2$ evolution response.

The #600 roughened surface shows reflection losses comparable to the #4000 surface but with increased photocurrent, indicating active centers outnumbering recombination centers, and slightly improved oxygen evolution.

The test results expressed in the Table clearly indicate that the grooved surface is the most efficient in minimizing surface reflection losses and recombination centers while the oxygen gas evolution is brought to nearly the theoretical limit by providing catalytically active centers for the holes to combine with hydroxyl ions.

EXAMPLE 2

Smooth, grooved polycrystalline n-type $TiO_2$ semiconductor anodes are prepared and tested in accordance with Example 1. The grooved surface exhibits analogous results to the data obtained for the single crystalline n-type $TiO_2$ semiconductor anodes.

We claim:

1. An n-type semiconductor anode for a water photolysis apparatus comprising:
   an n-type $TiO_2$ semiconductor anode having one or a plurality of grooves in the surface of said anode incident to solar radiation wherein the spacing of said groove or plurality of grooves is from about 0.5 to 1.5 cm apart with a width and depth of from about 0.02 mm to about 0.08 mm.

2. An anode according to claim 1 further comprising an ohmic contact on the side of said anode opposite to said grooves.

3. An anode according to claim 2 wherein said ohmic contact is a titanium diffusion junction formed by electron beam evaporation of titanium onto said anode.

4. An anode according to claim 1 wherein said grooves are about 1.00 cm apart with a width and depth of about 0.05 mm.

5. An anode according to claim 1 wherein the n-type $TiO_2$ is monocrystalline.

6. An anode according to claim 1 wherein the n-type $TiO_2$ is polycrystalline.

7. In a method for producing hydrogen and oxygen from a water photolysis cell, comprising the steps of irradiating with solar radiation an n-type $TiO_2$ semiconductor anode immersed in an electrolyte solution to produce oxygen gas and the generation of an electrical current, electrically connecting said n-type semiconductor anode to a cathode in said electrolyte solution, thereby producing hydrogen gas at said cathode, wherein the improvement comprises forming one or a plurality of grooves in the radiation incident surface of said n-type $TiO_2$ semiconductor anode to provide activation centers for increasing the evolution of oxygen gas, minimizing the reflection losses of solar radiation on said n-type semiconductor anode, and increasing the current at the cathode for more efficient evolution of hydrogen.

8. A method according to claim 7 wherein said semiconductor anode further incorporates a titanium diffusion junction ohmic contact formed by electron beam evaporation of titanium onto a surface of the semiconductor anode opposite to said grooves.

9. A method according to claim 7 wherein said grooves are from about 0.5 cm to about 1.5 cm apart and with a width and depth of from about 0.02 mm to about 0.08 mm.

10. A method according to claim 9 wherein said grooves are spaced about 1.0 cm apart and with a width and depth of about 0.05 mm.

11. A method according to claim 7 wherein said electrolyte is about 0.1 to about 5.0 normal sodium hydroxide.

12. In a water photolysis apparatus comprising a housing adapted to contain an electrolyte, an n-type $TiO_2$ semiconductor anode and a cathode adapted to contact said electrolyte, wherein the improvement comprises one or more grooves formed in the radiation incident surface of said n-type $TiO_2$ semiconductor anode to increase the photocurrent and to provide catalytically active centers for the evolution of oxygen from said semiconductor anode.

13. An apparatus according to claim 12 further comprising an electrical biasing means connected in series with said semiconductor anode and said cathode.

14. An apparatus according to claim 13 wherein said electrical biasing means is a solar cell.

15. An apparatus according to claim 12 wherein said cathode is Ni/NiO.

16. An apparatus according to claim 12 wherein the groove or grooves in said n-type $TiO_2$ semiconductor anode are spaced from about 0.5 cm to about 1.50 cm apart with a depth and width of from about 0.02 mm to about 0.08 mm.

17. An apparatus according to claim 16 wherein said grooves are spaced about 1.0 cm apart and with a width and depth of about 0.05 mm.

* * * * *